United States Patent [19]

Brooks

[11] Patent Number: 4,684,674

[45] Date of Patent: Aug. 4, 1987

[54] INJECTION MOLDABLE POLYAMIDE-IMIDE CONTAINING AROMATIC SULFONE POLYMERS

[75] Inventor: Gary T. Brooks, Naperville, Ill.

[73] Assignee: Standard Oil Company (Indiana), Chicago, Ill.

[21] Appl. No.: 758,340

[22] Filed: Jul. 24, 1985

Related U.S. Application Data

[63] Continuation of Ser. No. 595,272, Mar. 30, 1984, abandoned.

[51] Int. Cl.[4] .................. C08K 9/00; C08F 283/04
[52] U.S. Cl. .................. 523/205; 523/209; 524/538; 525/420

[58] Field of Search .................. 525/420; 524/538; 523/205, 209

[56] References Cited

U.S. PATENT DOCUMENTS 4,340,697  7/1982  Aya et al. .................. 525/420

*Primary Examiner*—John C. Bleutge
*Assistant Examiner*—A. L. Carrillo
*Attorney, Agent, or Firm*—Robert G. Ladd; William H. Magidson; Ralph C. Medhurst

[57] ABSTRACT

Novel polyamide-imide-phthalamide copolymers and polyamide-imide copolymers containing aromatic sulfone polymers are disclosed. These copolymers are useful in the manufacture of molded objects and engineering resins.

8 Claims, No Drawings

INJECTION MOLDABLE POLYAMIDE-IMIDE CONTAINING AROMATIC SULFONE POLYMERS

This is a continuation of application Ser. No. 595,272, filed Mar. 30, 1984, now abandoned.

FIELD OF THE INVENTION

The field of this invention relates to polyamide-imide copolymers containing aromatic sulfone polymers and to molding powders and molded articles prepared therefrom.

BACKGROUND

Polyamide-imide (PAI) polymers are a relatively new class of organic compounds known for their solubility in nitrogen-containing organic solvents when in the largely polyamide form. The major application of the amide-imide polymers has been as wire enamels. This is illustrated in U.S. Pat. Nos. 3,661,832 (1972), 3,494,890 (1970) and 3,347,828 (1967).

Compositions prepared from isophthalic acid and diamines and aliphatic diamines have found application in coatings and films. The prior art on this is summarized in U.S. Pat. No. 3,444,183 (1969).

Reinforced polyhexamethylene isophthalamides have been used to produce articles as disclosed in U.S. Pat. No. 4,118,364 (1978). However, the physical properties of these reinforced polyhexamethylene isophthalamides are insufficient for use in engineering plastics since their tensile strength and the continuous service temperature do not meet those required for engineering plastics.

Polyamide-imides are very rigid polymers which sometimes lack the inherent toughness needed to compete in those applications which require elevated temperature resistance and good impact strength. The lack of matrix toughness can cause problems when molding thick cross-sectional parts, especially with the filled polyamide-imide-phthalamide copolymers since the polymer matrix is not tough enough to resist the molding cooldown stresses which can result in internal cracks. The art has been looking for improvements in the impact resistance and toughness of the polymer but it is essential that the additive not impair the excellent curing characteristics of the PAI or its thermal and strength properties, particularly the heat deflection temperature and tensile strength.

The general object of this invention is to provide polyamide-imide copolymers containing aromatic sulfone polymers. A more specific object of this invention is to provide polyamide-imide copolymers suitable for use as engineering plastics and particularly for use in injection molding and wherein the toughness properties of the copolymers, especially their impact resistance, are improved by the addition of about 0.01 to about 50 percent by weight of an aromatic sulfone polymer. An even more specific object of this invention is to provide polyamide-imide-phthalamide copolymer suitable for use as engineering plastics and particularly for use in injection molding and wherein the as-molded properties of the copolymer are significantly improved wherein thicker wall parts can be molded crack-free by the addition of about 0.1 to 50 percent by weight of an aromatic sulfone polymer. Other objects appear hereinafter.

I have now found that amide-imide-phthalamide copolymers, obtained by reacting a polycarboxylic acid anhydride and a dicarboxylic acid with primary diamines or a mixture of primary diamines comprising about 0.1 to about 50 percent by weight of polyarylsulfones, polysulfone, and polyethersulfone (PES), have excellent physical properties and can readily be injection molded to provide engineering plastics with excellent properties. The aromatic sulfone polymers improve the as-molded physical properties of neat or filled amide-imide-phthalamide copolymers. The beneficial features of the aromatic polysulfone polymers are also observed when glass fibers, glass beads, mineral fillers, graphite fiber or graphite powder are coated with the aromatic sulfone polymers. The polysulfone polymer coated fillers can be more readily incorporated into a molded amide-imide-phthalamide article of manufacture.

Suitable aromatic sulfone polymers used in the preparation of our novel injection moldable polyamide-imide-phthalamide copolymers (U.S. Pat. No. 4,313,868) containing polyethersulfones comprise a linear polymer containing three kinds of unit bonds consisting of an arylene bond, an ether bond and a sulfone bond. Representative examples of these aromatic polysulfone resins include those represented by the following formulae:

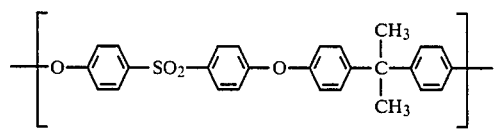

("Udel P-1700" manufactured by UCC)

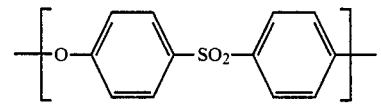

(Polyether-sulfone "Victrex" manufactured by ICI)

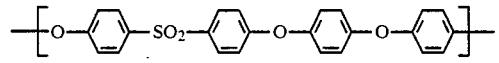

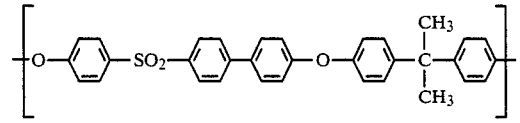

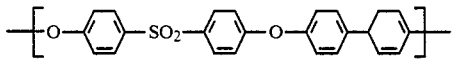

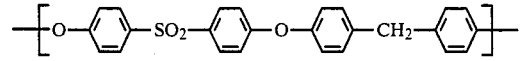

These aromatic polysulfones are easily manufactured by the methods disclosed, for example, in Japanese Patent Application Publication No. 7799/1967 and Japanese Patent Application Publication No. 617/1972. Suitably, one or more of these polysulfones are used in the same amide-imide system. Preferably, not more than two different polysulfones are used in each polyamide-imide system.

The amide-imide copolymers comprise recurring polyamide A units of:

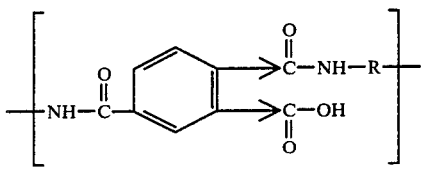

which are capable of undergoing imidization, and polyamide B units of:

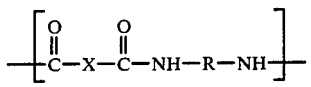

wherein the molar ratio of A units to B units is about 80 to about 20 to about 20 to about 80, preferably about 1 to 1, and wherein R is a divalent aromatic hydrocarbon radical of from about 6 to about 20 carbon atoms or two divalent hydrocarbons joined directly or by stable linkages selected from the group consisting of —O—, methylene, —CO—, —SO$_2$—, and wherein X is a divalent aromatic radical and Σ denotes isomerization.

In the injection molded form the polyamide A units have been converted to the polyamide-imide A' units and the copolymer comprises recurring polyamide-imide A' units of:

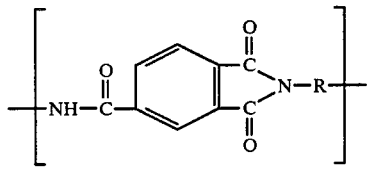

and polyamide B units of:

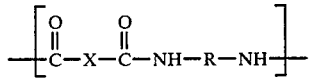

wherein the molar ratio of A' to B units is about 80 to about 20 to about 20 to about 80, preferably about 1 to about 1, and wherein R and X are defined as above.

The copolymers of this invention are prepared from diamines and acyl halide derivatives of dicarboxylic acid such as isophthalic acid or terephathalic acid and an anhydride-containing substance. Useful acyl halide derivatives of dicarboxylic acid include:

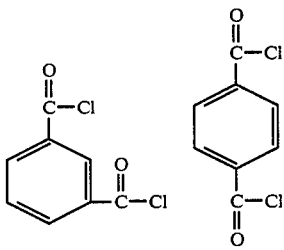

and related compounds. Suitably, the anhydride containing substance has one acyl halide group and one anhydride group in the aromatic ring. The preferred anhydride is the four acid chloride of trimellitic anhydride (4-TMAC).

Useful aromatic diamines include para- and meta-phenylenediamine, oxybis(aniline), thiobis(aniline), sulfonylbis(aniline), diaminobenzophenone, methylenebis(aniline), benzidine, 1,5-diaminonaphthalene, oxybis(2-methylaniline), thiobis(2-methylaniline), and the like. Examples of other useful aromatic primary diamines are set out in U.S. Pat. No. 3,494,890 (1970) and U.S. Pat. No. 4,016,140 (1977) both incorporated herein by reference. The preferred diamine is metaphenylenediamine.

The copolymers of this invention can be prepared by reacting a mixture of an acyl halide derivative of an aromatic tricarboxylic acid anhydride and acyl halide derivatives of aromatic dicarboxylic acids with aromatic diamines.

Other amide-imide copolymers of this invention are prepared by reacting an acyl halide derivative of an aromatic tricarboxylic acid anhydride with one or a mixture of largely- or wholly-aromatic primary diamines. The resulting products are polyamides wherein the linking groups are predominantly amide groups, although some may be imide groups, and wherein the structure contains free carboxylic acid groups which are capable of further reaction. Such polyamides are moderate molecular weight (7–13,000 as prepared) polymeric compounds, having in their molecule, units of:

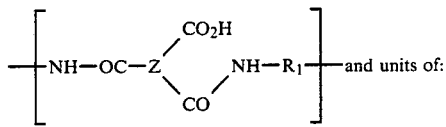 and units of:

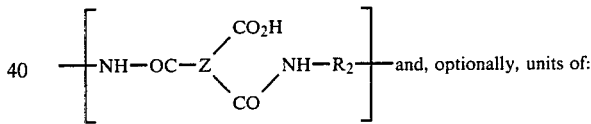 and, optionally, units of:

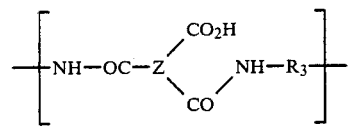

wherein the free carboxyl groups are ortho to one amide group, Z is an aromatic moiety containing 1 to 4 benzene rings or lower-alkyl-substituted benzene rings; $R_1$, $R_2$ and $R_3$ are the same for homopolymers and are different for copolymers and are divalent wholly- or largely-aromatic hydrocarbon radicals. These hydrocarbon radicals may be a divalent aromatic hydrocarbon radical of from about 6 to about 10 carbon atoms, or two divalent aromatic hydrocarbon radicals each of from about 6 to about 10 carbon atoms joined directly or by stable linkages such as —O—, methylene, —CO—, —SO$_2$—, —S—; for example, —R'—O—R'—, —R'—CH$_2$—R'—, —R'—CO—R'—, —R'—SO$_2$—R'— and —R'—S—R'—.

Said polyamides are capable of substantially complete imidization by heating, by which they form the polyamide-imide structure having, to a substantial extent, recurring units of:

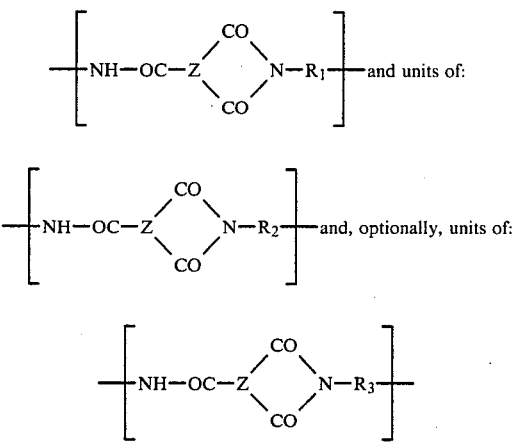

wherein one carbonyl group is meta to and one carbonyl group is para to each amide group and wherein Z, $R_1$, $R_2$ and $R_3$ are defined as above. Typical copolymers of this invention have up to about 50 percent imidization prior to heat treatment, typically about 10 to about 40 percent.

A process for improving the Dart Impact Strength and related properties of the polyamide-imide copolymer comprising units of:

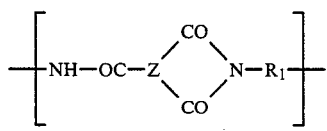

and units of:

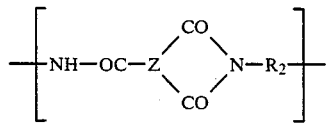

wherein one carbonyl group is meta to, and one carbonyl group is para to each amide group and wherein Z is a trivalent benzene ring or lower-alkyl-substituted trivalent benzene ring, $R_1$ and $R_2$ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —SO$_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit which process comprises adding about 0.1 to about 50 percent by weight of an aromatic polysulfone.

The polyamide-imide copolymers are prepared from an anhydride-containing substance and a mixture of wholly- or partially-aromatic primary diamines or fully or partially acylated diamines. The process using acylated diamines is disclosed in U.S. Pat. No. 4,309,528, incorporated herein by reference. Usefully, the anhydride-containing substance is an acyl halide derivative of the anhydride of an aromatic tricarboxylic acid which contains about 1 to about 4 benzene or lower-alkyl-substituted benzene rings and wherein two of the carboxyl groups are ortho to one another. More preferably, the anhydride-containing substance is an acyl halide derivative of an acid anhydride having a single benzene or lower-alkyl-substituted benzene ring, and most preferably, the substance is the acyl chloride derivative of trimellitic acid anhydride (4-TMAC).

We can use a single diamine but usefully the mixture of diamines contains two or more, preferably two or three, wholly- or largely-aromatic primary diamines. More particularly, they are wholly- or largely-aromatic primary diamines containing from about 6 to about 10 carbon atoms or wholly- or largely-aromatic primary diamines composed of two divalent aromatic moieties of from about 6 to about 10 carbon atoms, each moiety containing one primary amine group, and the moieties linked directly or through, for example, a bridging —O—, —S—, —SO$_2$—, —CO—, or methylene group. When three diamines are used they are preferably selected from the class composed of:

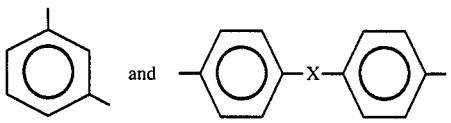

said X being an —O—, —CH$_2$—, or —SO$_2$— group. More preferably, the mixture of aromatic primary diamines is in the one-component or two-component system and is composed of meta-phenylenediamine and p,p'-oxybis(aniline) and metaphenylenediamine, or p,p'-sulfonylbis(aniline) and p,p'-methylenebis(aniline). Most preferably, the mixture of primary aromatic diamines contains metaphenylenediamine and p,p'-oxybis-(aniline). In the one-component system, the preferred diamines are oxybis(aniline) or meta-phenylenediamine. The aromatic nature of the diamines provides the excellent thermal properties of the homopolymer and copolymers while the primary amine groups permit the desired imide rings and amide linkages to be formed.

Usually, the polymerization or copolymerization is carried out in the presence of a nitrogen-containing organic polar solvent such as N-methylpyrrolidone, N,N-dimethylformamide and N,N-dimethylacetamide.

The amount of the aromatic sulfone polymers added to the polyamide-imide-phthalamide copolymer or the polyamide-imide polymer can be about 0.1 to about 50 weight percent, usually in the range of about 10 to about 40 weight percent.

Polyamide-imide-phthalamide copolymers and the polyamide-imide polymers build their properties during the annealing step. The as molded properties are significantly below the annealed properties. To build polyamide-imide-phthalamide properties and polyamide-imide properties, parts are annealed at temperatures up to about 530° F., but preferably at about 500° F.

Since polyamide-imides must be cured at temperatures up to and above about 500° F., it is important that the blend can withstand these cure temperatures without stress relaxation or distorting. In an amide-imide miscible alloy where a single blend glass transition temperature (Tg) is formed, only a 25° F. to 50° F. drop in Tg is allowed during blending. A bigger drop in Tg could result in a product which could not be adequately cured. This Tg constraint along with the substantially lower secondary polymer Tg makes blend miscibility not always desirable, especially if high loadings of a secondary polymer are needed to improve the workability of the amide-imide. In an ideal amide-imide alloy, the secondary polymer should have a Tg close to the amide-imide, while being significantly less viscous and similar enough in structure and/or polarity to be compatible with the amide-imide molecules.

To determine if the polyamide-imide described in U.S. Pat. Nos. 4,136,085 and 4,313,868 is miscible with polyethersulfone, an Omnitherm QC25 differential scanning calorimeter, scanning at about 20° C./minute, was used. 80/20, 70/30, and 50/50 blends of polyamide-imide/polyethersulfone sulfone (PAI/PES) have two separate glass transition temperatures (Tg), one for the PES components (~222° C.) and one for the PAI component (~260° C.). A completely miscible system would exhibit a single Tg, while a partly miscible blend would have two Tg's. For a partly miscible blend, the Tg's may be broadened and shifted in temperature from those of the pure components. The polyamide-imide/polyethersulfone blends show no evidence of a system which is miscible. Immiscible blends have two Tg's, each at the temperature of one of the pure components. This was the case with the polyamide-imide/polyethersulfone blends. Although the polyamide-imide/polyethersulfone materials are not miscible, they exhibit excellent blend homogeneity where the majority of separate polymer domains are less than 0.5 micron. The excellent homogeneity within immiscible blend suggests that these materials have enough molecular attraction to be compatible since it would take an order of magnitude of mixing above that of a conventional extruder to get this level of polymer dispersion in an immiscible, incompatible blend. To determine the blend homogeneity, samples were analyzed for sulfur (PES component) using the Scanning Electron Microscope-Energy Dispersive X-ray Analyses (SEM-EDAX) at magnifications up to about 22,000X. The blends of PAI & PES do not delaminate or fibrillate, again indicating a compatible blend.

The addition of a polysulfone or a polysulfone to a polyamide-imide produces a blend with separate pure component Tg's. However, the addition of polysulfone (Udel P1700) to an amide-imide does not result in the same level of polymer-polymer homogeneity as seen with the PAI/PES blend. The polyamide-imide/polysulfone blends (80/20 & 70/30) have large polymer-rich domains of polysulfone and polyamide-imide unlike the polyamide-imide/polyethersulfone blends. This suggests that differences do exist among various polyamide-imide/aromatic sulfone polymer blends which are not predictable by conventional thermal analysis (blend Tg). The PES used in the SEM experiments was Victrex 600P, which has a much higher melt viscosity than the polysulfone (Udel P1700). The viscosity differences would favor mixing in the polyamide-imide/polysulfone blend.

More important, we have found that the addition of polyethersulfone affects various polyamide-imides differently, especially their physical property response, and the effect is dependent on which polyamide-imide formulation is used in the blend. When polyamide-imide phthalamide copolymer blends are prepared via U.S. Pat. No. 4,313,868, and alloyed with polyethersulfone, tensile strength properties of the blend are synergistic where the strength of the alloy is greater than either of the pure polymer components. This synergistic effect is ideal with the polyamide-imide-phthalamide copolymer/polyethersulfone blends and is one aspect of the novel composition disclosed herein. When polyamide-imides are prepared via U.S. Pat. No. 4,136,085 and alloyed with the same polyethersulfone, tensile strength properties of the blend follow an additive trend, which is predictable by the laws of mixing, where the blend properties fall between the properties of the pure polymer components.

To further illustrate the difference between the polyamide-imides alloyed with the same polyethersulfone, one can compare the homogeneity of these alloys. Similar alloy concentrations were examined with a Phillips 501 SEM at powers of up to about 12,500 X. Polyamide-imide-phthalamide copolymer prepared via U.S. Pat. No. 4,313,868 and alloyed with 20 percent by polymer weight of Victrex 600P (polyethersulfone) has PES phase domains ranging in size from about 1 µm to about 0.08 µm. The morphology of a 70/30 blend of the same constituents is different than that of the 80/20 blend. In the 70/30 blend, the PES phase is continuously surrounding large polyamide-imide domains. Some of the polyamide-imide domains are isolated while many continue into their neighbor. The polyamide-imide phase also contains small isolated domains of PES.

Polyamide-imides prepared via U.S. Pat. No. 4,136,085 and alloyed with 50 percent by polymer weight of Victrex 600P (polyethersulfone) have two distinct phases. The PES phase is a continuous matrix surrounding the PAI phase. In general, the polyamide-imide domains range in size from about ¼ µm to more than 1 µm. Distinct domains of PAI and PES are not as apparent in the 80/20 or 70/30 blends. As the concentration of PES in the blend increases, so does the density of sulfur as determined on the SEM to obtain EDAX from which the electron dot map (EDM) is obtained. In the case of the 80/20 and 70/30 blends, some areas of the EDM are devoid of sulfur. This suggests areas of pure polyamide-imide domains. The remaining area on the EDM is covered fairly uniformly with evidence of sulfur. This entire area could not be pure PES since it covers more than about 20% or about 30% of the surface. The balance of the area then contains both polyamide-imide and polyethersulfone. The texture hints that small domains of polyamide-imide may exist in a thin cluster of more ductile PES. This further suggests that the domains are smaller than ⅛ µm.

The level and degree of homogeneity within these blends may possibly explain the difference in the property response between the two different polyamide-imide based polyethersulfone blends. It is evident that polyamide-imides prepared from different monomers act differently when allowed with the same polyethersulfone.

Table 1 illustrates the importance of curing polyamide-imides. These polymer alloys have little, if any, commercial use if they are not cured.

TABLE 1

|  | As Molded | Annealed at 500° F. |
|---|---|---|
| % Glass loading | 40 | 40 |
| Injection molding temps. | 650° F. | 650° F. |
| Physical Properties |  |  |
| Tensile strength (psi) | 10,800 | 32,400 |
| Tensile elongation (%) | 2.0 | 5.1 |
| Flexural modulus (psi) | 2,008,000 | 2,000,000 |
| HDT °F. | 484 | 550 |
| Izod impact ft.-lbs. | 1.0 | 1.6 |

TABLE 1-continued

|  | As Molded | Annealed at 500° F. |
| --- | --- | --- |
| in. of notch |  |  |

After cure, a representative 20 percent polyethersulfone or polyarylsulfone or polysulfone neat polyamide-imide-phthalamide copolymer sample had total shrinkage of 10 mils per inch, while the polyamide-imide control had a shrinkage of 8 mils per inch.

Polyamide-imide-phthalamide aromatic sulfone polymers coated on sized fillers such as glass fibers give better molding characteristics and improved as-molded properties. Thus, polyamide-imide-phthalamide aromatic sulfone polymers, containing about 20 to about 60 percent filler and having improved physical properties, can be marketed.

Cavity pressure measurements are used as quality control checks of polyamide-imide-phthalamide aromatic sulfone polymer resin viscosity. Pressure buildup during the filling of an injection molded part is measured at a point in the cavity (ejector pin). This is accomplished by placing a pressure transducer behind the ejector pin and recording the pressure with a chart recorder or other readout device. Cavity pressure normally rises as the mold is being filled and peaks as the molten resin is packed into the cavity. As the resin solidifies, cavity pressure decreases.

We have found that resins which have low cavity pressure process poorly and that spiral flow measurements were not sensitive enough to discriminate between resins in the viscosity range of interest. Low cavity pressures indicate a large pressure drop between injection and cavity pressures. This indicates higher resin viscosities. In the same manner, high cavity pressures indicate less pressure change between injection and cavity pressures, suggesting lower resin viscosities.

Polyamide-imide-phthalamide and polyamide-imide copolymer viscosities have been measured by spiral flow determinations previous to the implementation of the cavity pressure procedure, see U.S. Pat. No. 4,224,214. Cavity pressure was selected over spiral flow because of its greater sensitivity. The cavity pressure test has been implemented as a polyamide-imide-phthalamide copolymer/aromatic sulfone polymer blend quality control procedure. Like spiral flow, cavity pressure is a test that can be done conveniently in a molder's shop.

The injection molding machine was equipped with a horizontally mounted thermoset screw and barrel assembly. The mold was heated with hot oil from a Mokon Model 105-057 heating unit. Cavity pressure was recorded with a Control Process Model 241 recorder. The mold was equipped to handle pressure transducers at the ejector pins located at the gate end of the tensile bar and the gate end of the flex bar before we begun our work. Since it was desirable to make cavity pressure measurements at the dead end of the flex bar, it was necessary to make some modifications in the mold base to accommodate a transducer at this pin position.

Resins were dried in a desiccant hot air circulating oven at about 300° F. to about 400° F. for at least 16 hours before testing. Moisture in polyamide-imide-phthalamide copolymer/aromatic sulfone polymer blends has a very significant effect on their flow properties. Therefore, special care was taken to be sure that the samples were properly dried. This drying procedure was used before making flow rate and cavity pressure measurements.

The flow rate procedure was patterned after the standard method described in ASTM D1238. A 335° C. (635° F.) barrel temperature with a 30 minute preheat time was used. This is about the largest set of weights that can be used safely with the standard extrusion plastometer apparatus. A standard 0.0825 in. diameter, 0.315 in. long orifice was used.

Special care was taken to be sure that each flow rate measurement was started when an equivalent volume of resin was in the barrel. Previous rheology work indicated that there is a very large "barrel height" effect on polyamide-imide-phthalamide copolymers. Each flow rate measurement was initiated while the top of the piston collar was between the two scribe marks on the piston. This precaution is also required by ASTM in method D1238.

The reinforced polyamide-imide-phthalamide copolymer/aromatic sulfone polymer blends may be prepared in various ways. For example, so-called roving endless glass fiber strands are coated with the aromatic sulfone polymer and then are further coated with the polyamic acid melt and subsequently chopped. The chopped fibers or the glass beads coated with the aromatic sulfone polymer may also be mixed with granulated polyamic acid and the resulting mixture melted in a conventional extruder, or alternatively, the fibers coated with the aromatic sulfone polymer may be directly introduced into the polyamic acid melt through a suitable inlet in the extruder. Injection molding of the unfilled or glass-filled polyamide-imide-phthalamide aromatic sulfone polymer blends can be accomplished by injecting the blend into a mold maintained at a temperature of about 350° F. to about 450° F. In this process, a 15 to 30 second cycle is used with a barrel temperature of about 580° F. to about 670° F. The injection molding conditions are given in Table 2.

TABLE 2

|  | Set Points |
| --- | --- |
| Cylinder temperatures (°F.) |  |
| Nozzle | 630–650° F. |
| Front zone | 630–650° F. |
| Rear zone | 620–640° F. |
| Timer (seconds) |  |
| Clamp closed (cure) | 18 |
| Injection hold | 6 |
| Booster (inj. hi) | 2 |
| Cycle delay (open) | 1 |
| High-Low | 2 |
| Injection pressure (psi) |  |
| High | 20,000 |
| Low | 10,000 |
| Machine settings |  |
| Clamp pressure (tons) | Max |
| Injection rate | Max |
| Screw RPM | 50 |
| Feed setting | As Req'd. |
| Cushion | ¼" |
| Back pressure (psi) | 220 |
| Mold temperature (°F.) |  |
| Stationary | 450 |
| Movable | 450 |
| Hopper drier | 220 |

The mechanical properties of the unfilled polyamide-imide-phthalamide copolymers, prepared as in Example II, containing various aromatic sulfone polymers (melt compounded) and also the polyamide-imide, prepared as in Example I, containing aromatic sulfone polymer blends are given in Table 3. The data in the table shows that these copolymers have excellent cured mechanical and thermal properties despite the fact that they contain about 10 to about 50 weight percent of an aromatic sulfone polymer.

TABLE 3

| % Polyamide-imide | | | | |
|---|---|---|---|---|
| Example I Prepared | 100 | 80 | 70 | 50 |
| Example II Prepared | — | — | — | — |
| % Polyethersulfone | | | | |
| Victrex 600P | 0 | 20 | 30 | 50 |
| Victrex 200P | — | — | — | — |
| % Polysulfone (Udel P1700) | — | — | — | — |
| % Polyarylsulfone (Radel A-400) | — | — | — | — |
| Cavity Pressure PSI | 12,600 | 16,000 | 16,000 | 17,700 |
| Total Shrinkage mils/in. | 8.0 | 9.3 | 10.1 | 15.7 |
| Physical Properties | | | | |
| Tensile Strength × $10^3$ PSI | 27.1 | 22.8 | 20.0 | 16.5 |
| Tensile Elongation % | 14.1 | 22.8 | 21.6 | 9.4 |
| Flexural Strength × $10^3$ PSI | 29.3 | 26.6 | 27.8 | 24.4 |
| Flexural Modulus × $10^6$ PSI | .69 | .61 | .60 | .50 |
| Izod Impact, Notched Ft-lbs/in | 2.5 | 3.2 | — | 1.0 |
| Dart Impact in-lbs | 20.4 | 126.7 | 101.8 | — |
| Thermal Properties | | | | |
| HDT, °F. | 529 | 528 | 522 | 438 |
| Flexural Strength × $10^3$ PSI | | | | |
| @ 275° F. | 26.2 | 23.4 | — | — |
| @ 400° F. | 20.1 | 17.4 | 15.0 | — |
| @ 500° F. | 11.7 | 6.6 | — | — |
| Thermal Aging Properties | | | | |
| Tensile Strength × $10^3$ PSI | | | | |
| After 500 hrs @ 500° F. | 28.2 | 22.4 | — | — |
| After 1000 hrs @ 500° F. | 28.0 | 22.5 | — | — |
| HDT, °F. | | | | |
| After 500 hrs @ 500° F. | 554 | 541 | — | — |
| After 1000 hrs @ 500° F. | 557 | 542 | — | — |
| Flexural Modulus × $10^6$ PSI | | | | |
| After 500 hrs @ 500° F. | .79 | .70 | — | — |
| After 1000 hrs @ 500° F. | .77 | .73 | — | — |
| % Polyamide-imide | | | | |
| Example I Prepared | 30 | 0 | 100 | 80 |
| Example II Prepared | — | — | — | — |
| % Polyethersulfone | | | | |
| Victrex 600P | 70 | 100 | — | — |
| Victrex 200P | — | — | 0 | 20 |
| % Polysulfone (Udel P1700) | — | — | — | — |
| % Polyarylsulfone (Radel A-400) | — | — | — | — |
| Cavity Pressure PSI | 17,000 | 19,600 | 12,700 | 16,400 |
| Total Shrinkage mils/in. | * | 8.0** | 8.0 | 8.0 |
| Physical Properties | | | | |
| Tensile Strength × $10^3$ PSI | — | 14.3 | 27.9 | 21.7 |
| Tensile Elongation % | — | 27.9 | 14.1 | 10.2 |
| Flexural Strength × $10^3$ PSI | — | 23.0 | 34.3 | 29.2 |
| Flexural Modulus × $10^6$ PSI | — | .43 | .74 | .620 |
| Izod Impact, Notched Ft-lbs/in | — | 1.5 | 2.54 | 1.80 |
| Dart Impact in-lbs | — | — | — | — |
| Thermal Properties | | | | |
| HDT, °F. | — | 422 | 528 | 525 |
| Flexural Strength × $10^3$ PSI | | | | |
| @ 275° F. | — | 17.1 | — | — |
| @ 400° F. | — | 10.3 | 19.8 | 16.2 |
| @ 500° F. | — | 450° F. | — | — |
| Thermal Aging Properties | | | | |
| Tensile Strength × $10^3$ PSI | | | | |
| After 500 hrs @ 500° F. | — | — | — | — |
| After 1000 hrs @ 500° F. | — | — | — | — |
| HDT, °F. | | | | |
| After 500 hrs @ 500° F. | — | — | — | — |
| After 1000 hrs @ 500° F. | — | — | — | — |
| Flexural Modulus × $10^6$ PSI | | | | |
| After 500 hrs @ 500° F. | — | — | — | — |
| After 1000 hrs @ 500° F. | — | — | — | — |

TABLE 3-continued

| % Polyamide-imide | | | | |
|---|---|---|---|---|
| Example I Prepared | 0 | 80 | 70 | 0 |
| Example II Prepared | — | — | — | — |
| % Polyethersulfone | | | | |
| Victrex 600P | — | — | — | — |
| Victrex 200P | 100 | — | — | — |
| % Polysulfone (Udel P1700) | — | 20 | 30 | 100 |
| % Polyarylsulfone (Radel A-400) | — | — | — | — |
| Cavity Pressure PSI | 20,000 | 19,700 | 20,000 | 20,000 |
| Total Shrinkage mils/in. | — | 7.4 | 7.7 | — |
| Physical Properties | | | | |
| Tensile Strength × $10^3$ PSI | 13.7 | 19.8 | 17.7 | 9.9 |
| Tensile Elongation % | 47.9 | 12.1 | 10.3 | 84.2 |
| Flexural Strength × $10^3$ PSI | 22.7 | 28.3 | 26.3 | 17.3 |
| Flexural Modulus × $10^6$ PSI | .425 | .591 | .561 | .395 |
| Izod Impact, Notched Ft-lbs/in | 1.1 | 1.0 | 1.62 | 1.82 |
| Dart Impact in-lbs | — | — | — | — |
| Thermal Properties | | | | |
| HDT, °F. | 432 | 533 | 520 | 326 |
| Flexural Strength × $10^3$ PSI | | | | |
| @ 275° F. | — | — | — | — |
| @ 400° F. | 7.0 | 9.7 | 6.2 | 0 |
| @ 500° F. | — | — | — | — |
| Thermal Aging Properties | | | | |
| Tensile Strength × $10^3$ PSI | | | | |
| After 500 hrs @ 500° F. | — | — | — | — |
| After 1000 hrs @ 500° F. | — | — | — | — |
| HDT, °F. | | | | |
| After 500 hrs @ 500° F. | — | — | — | — |
| After 1000 hrs @ 500° F. | — | — | — | — |
| Flexural Modulus × $10^6$ PSI | | | | |
| After 500 hrs @ 500° F. | — | — | — | — |
| After 1000 hrs @ 500° F. | — | — | — | — |
| % Polyamide-imide | | | | |
| Example I Prepared | — | — | — | — |
| Example II Prepared | 100 | 80 | 70 | 0 |
| % Polyethersulfone | | | | |
| Victrex 600P | — | 20 | 30 | 100 |
| Victrex 200P | — | — | — | — |
| % Polysulfone (Udel P1700) | — | — | — | — |
| % Polyarylsulfone (Radel A-400) | — | — | — | — |
| Cavity Pressure PSI | 13,700 | 14,800 | 16,100 | 19,600 |
| Total Shrinkage mils/in. | 7.7 | 8.4 | 8.4 | — |
| Physical Properties | | | | |
| Tensile Strength × $10^3$ PSI | 16.8 | 24.6 | 20.9 | 14.3 |
| Tensile Elongation % | 5.8 | 10.9 | 9.4 | 27.9 |
| Flexural Strength × $10^3$ PSI | 33.7 | 33.3 | 30.8 | 23.0 |
| Flexural Modulus × $10^6$ PSI | 0.84 | 0.64 | 0.58 | 0.43 |
| Izod Impact, Notched Ft-lbs/in | 0.3 | 1.20 | 1.0 | 1.5 |
| Dart Impact in-lbs | <2.0 | 21.4 | — | — |
| Thermal Properties | | | | |
| HDT, °F. | 552 | 557 | 522 | 422 |
| Flexural Strength × $10^3$ PSI | | | | |
| @ 275° F. | 26.9 | 28.4 | 22.9 | 17.1 |
| @ 400° F. | 24.8 | 22.3 | 18.4 | 10.3 |
| @ 500° F. | 15.6 | 8.1 | 2.7 | 0 @ 450° F. |
| Thermal Aging Properties | | | | |
| Tensile Strength × $10^3$ PSI | | | | |
| After 500 hrs @ 500° F. | — | 23.9 | 20.8 | — |
| After 1000 hrs @ 500° F. | — | 22.0 | 19.1 | — |
| HDT, °F. | | | | |
| After 500 hrs @ 500° F. | — | 573 | 554 | — |
| After 1000 hrs @ 500° F. | — | 576 | 564 | — |
| Flexural Modulus × $10^6$ PSI | | | | |
| After 500 hrs @ 500° F. | — | .61 | .55 | — |
| After 1000 hrs @ 500° F. | — | .58 | .54 | — |
| % Polyamide-imide | | |
| Example I Prepared | — | — |
| Example II Prepared | 90 | 80 |
| % Polyethersulfone | | |
| Victrex 600P | — | — |
| Victrex 200P | — | — |

TABLE 3-continued

| | | |
|---|---|---|
| % Polysulfone (Udel P1700) | — | — |
| % Polyarylsulfone (Radel A-400) | 10 | 20 |
| Cavity Pressure PSI | 19,100 | 20,300 |
| Total Shrinkage mils/in. | 10.0 | 10.4 |
| Physical Properties | | |
| Tensile Strength × $10^3$ PSI | 19.4 | 21.6 |
| Tensile Elongation % | 7.5 | 10.4 |
| Flexural Strength × $10^3$ PSI | 34.4 | 33.2 |
| Flexural Modulus × $10^6$ PSI | 0.65 | 0.61 |
| Izod Impact, Notched Ft-lbs/in | 0.9 | 1.4 |
| Dart Impact in-lbs | — | — |
| Thermal Properties | | |
| HDT, °F. | 560 | 560 |
| Flexural Strength × $10^3$ PSI | | |
| @ 275° F. | — | — |
| @ 400° F. | — | — |
| @ 500° F. | — | — |
| Thermal Aging Properties | | |
| Tensile Strength × $10^3$ PSI | | |
| After 500 hrs @ 500° F. | — | — |
| After 1000 hrs @ 500° F. | — | — |
| HDT, °F. | | |
| After 500 hrs @ 500° F. | — | — |
| After 1000 hrs @ 500° F. | — | — |
| Flexural Modulus × $10^6$ PSI | | |
| After 500 hrs @ 500° F. | — | — |
| After 1000 hrs @ 500° F. | — | — |

*Distorted during curing @ 500° F.,
**Parts annealed @ 400° F. for 4 hrs.
Note: All samples with PAI as prepared in Example II have been cured at temperatures up to */* 515° F. All samples with PAI as prepared in Example I were cured @ 500° F.

The mechanical properties of the filled polyamide-imide-phthalamide copolymers, prepared as in example II, containing an aromatic sulfone polymer and also the polyamide-imide, prepared as in example I, containing an aromatic sulfone polymer are given in Table 4 and it shows that these copolymers have excellent cured mechanical and thermal properties despite the fact that they contain about 10 to about 50 polymer weight percent of an aromatic sulfone polymer. It is important to note that the polyamide-imide-phthalamide copolymer/polyethersulfone blends (prepared as in example II) had less flow than the polyamide-imide-phthalamide copolymer as measured by cavity pressure. This decrease in flow at injection molding shear rates is not seen with the polyamide-imides (prepared as in example I) polyethersulfone blend where with these blends only a slight increase in flow was noted. This further suggests that there are differences among polyamide-imide/polyethersulfone blends, and these differences are dependent on the polyamide-imide used in the alloy. The flow reduction with the polyamide-imide-phthalamide copolymer/polyethersulfone blend is in direct contrast to that prepared in U.S. Pat. No. 4,340,697 where it was found that a polyamide-imide/polyethersulfone blend had significantly better flow properties than PAI.

To further illustrate the difference between polyamide-imides prepared in example I and example II, one need only compare their flow characteristics. The viscosity of polyamide-imides prepared in example II is much more temperature sensitive but less shear rate sensitive than the polyamide-imide prepared in example I.

The shear sensitivity of these polymers can be illustrated by plotting apparent viscosity vs shear rate. Both the polyamide-imides are power law fluids where their viscosity and shear rate can be related through two experimental constants; the power law index (N) and the consistency index (K). The power law index can be calculated from the slope of the viscosity vs shear rate line where a steeper slope (greater value) means the polymer viscosity is more shear rate dependent. The polyamide-imide prepared in Example I has a viscosity vs shear rate slope of −0.75 while polyamide-imide prepared in Example II has a slope of −0.45.

The viscosity vs temperature response of these materials can be quantified by calculating an activation energy via an Arrhenius plot. The activation energy of the viscosity vs. temperature response for polyamide-imide phthalamide is approximately six times greater than for polyamide-imide copolymers. The greater activation energy of the polyamide-imide phthalamide indicates that this PAI melt viscosity is much more temperature sensitive than a PAI discussed in U.S. Pat. No. 4,136,085. Under conventional PAI processing temperature, 650° to 690° F., the PAI phthalamide copolymers have better flow properties than the PAI copolymers discussed in U.S. Pat. No. 4,136,085 and it is for these flow advantages that the PAI phthalamide copolymer does not need to be alloyed to improve its flow properties at injection molding shear rates.

TABLE 4

| | | | | |
|---|---|---|---|---|
| % Polyamide-imide | | | | |
| Example I Prepared | — | — | — | — |
| Example II Prepared | 60 | 54 | 48 | 0 |
| % Polyethersulfone Victrex | 0 | 6 | 12 | 70 |
| % Glass Fibers | 40 | 40 | 40 | 30 |
| % Graphite Fibers AS-1810 | — | — | — | — |
| Cavity Pressure × $10^3$ PSI | | | | |
| @ 18 sec | 17.1 | 10.6 | 13.5** | 19.0 |
| @ 90 sec | 19.0 | 11.2 | 13.8 | 19.0 |
| Total Shrinkage mils/in. (after curing @ 500° F.) | 1.0 | 1.0 | 1.0 | distorted |
| Physical Properties | | | | |
| Tensile Strength × $10^3$ PSI | 29.0 | 32.0 | 29.6 | 20.3 |
| Tensile Elongation % | 6.0 | 6.6 | 6.1 | 3.0 |
| Flexural Strength × $10^3$ PSI | 53.0 | 53.2 | 47.8 | — |
| Flexural Modulus × $10^6$ PSI | 1.99 | 1.92 | 1.86 | 1.22 |
| Izod Impact, Notched Ft-lbs/in | 1.51 | 1.64 | 1.54 | 1.5 |
| Thermal Properties | | | | |
| HDT, °F. | 550 | 555 | 555 | 421 |
| Flexural Strength × $10^3$ PSI | | | | |
| @ 275° F. | 40.9 | 43.5 | 34.5 | 22.1 |
| @ 400° F. | 36.1 | 37.8 | 30.6 | 14.6 |
| @ 450° F. | — | — | — | 0 |
| @ 500° F. | 26.9 | 26.7 | 16.4 | — |
| Thermal Aging Properties | | | | |
| Tensile Strength × $10^3$ PSI | | | | |
| After 500 hrs @ 500° F. | 30.0 | — | 29.1 | — |
| After 1000 hrs @ 500° F. | 26.5 | — | 25.8 | — |
| HDT, °F. | | | | |
| After 500 hrs @ 500° F. | 562 | — | 555 | — |
| After 1000 hrs @ 500° F. | 557 | — | 556 | — |
| Flexural Modulus × $10^6$ PSI | | | | |
| After 500 hrs @ 500° F. | 2.04 | — | 1.89 | — |
| After 1000 hrs @ 500° F. | 1.92 | — | 1.73 | — |
| % Polyamide-imide | | | | |
| Example I Prepared | — | 70 | 65 | 56 |
| Example II Prepared | 56 | — | — | — |
| % Polyethersulfone Victrex | 14 | — | 12 | 14 |
| % Glass Fibers | — | 30 | 23 | 30 |
| % Graphite Fibers AS-1810 | 30 | — | — | — |
| Cavity Pressure × $10^3$ PSI | | | | |
| @ 18 sec | 6.5 | 12.3 | 13.4 | 16.0 |
| @ 90 sec | — | 9.3 | — | 15.0 |
| Total Shrinkage mils/in. (after curing @ 500° F.) | 0.5 | 1.0 | — | 1.3 |
| Physical Properties | | | | |

TABLE 4-continued

| | | | | |
|---|---|---|---|---|
| Tensile Strength × 10³ PSI | 28.8 | 26.7 | 23.6 | 23.5 |
| Tensile Elongation % | 6.5 | 6.9 | 7.1 | 4.9 |
| Flexural Strength × 10³ PSI | 45.4 | 46.4 | 34.2 | 39.0 |
| Flexural Modulus × 10⁶ PSI | 2.65 | 1.57 | 1.25 | 1.43 |
| Izod Impact, Notched Ft-lbs/in | 1.1 | 1.6 | 1.0 | 1.0 |
| Thermal Properties | | | | |
| HDT, °F. | 549 | 543 | 527 | 527 |
| Flexural Strength × 10³ PSI | | | | |
| @ 275° F. | — | 32.5 | — | 27.9 |
| @ 400° F. | — | 26.6 | — | 20.3 |
| @ 450° F. | — | — | — | — |
| @ 500° F. | — | 15.6 | — | 6.7 |
| Thermal Aging Properties | | | | |
| Tensile Strength × 10³ PSI | | | | |
| After 500 hrs @ 500° F. | — | 27.2 | — | 23.7 |
| After 1000 hrs @ 500° F. | — | 26.7 | — | 22.2 |
| HDT, °F. | | | | |
| After 500 hrs @ 500° F. | — | 554 | — | 556 |
| After 1000 hrs @ 500° F. | — | 556 | — | 554 |
| Flexural Modulus × 10⁶ PSI | | | | |
| After 500 hrs @ 500° F. | — | 1.72 | — | 1.47 |
| After 1000 hrs @ 500° F. | — | 1.56 | — | 1.39 |
| % Polyamide-imide | | | | |
| Example I Prepared | 49 | 35 | 0 | 61 |
| Example II Prepared | — | — | — | — |
| % Polyethersulfone | | | | |
| Victrex | 21 | 35 | 70 | 15 |
| % Glass Fibers | 30 | 30 | 30 | — |
| % Graphite Fibers AS-1810 | — | — | — | 24 |
| Cavity Pressure × 10³ PSI | | | | |
| @ 18 sec | 13.0 | 13.2 | 17.5 | 6.4 |
| @ 90 sec | — | — | 17.5 | — |
| Total Shrinkage mils/in. (after curing @ 500° F.) | 3.3 | * | distorted | .5 |
| Physical Properties | | | | |
| Tensile Strength × 10³ PSI | 22.5 | 20.7 | 20.3 | 29.0 |
| Tensile Elongation % | 4.2 | 5.2 | 3.0 | — |
| Flexural Strength × 10³ PSI | 36.4 | 32.7 | — | 45.4 |
| Flexural Modulus × 10⁶ PSI | 1.53 | 1.45 | 1.22 | 2.49 |
| Izod Impact, Notched Ft-lbs/in | 1.0 | 1.0 | 1.5 | 0.9 |
| Thermal Properties | | | | |
| HDT, °F. | 532 | 4.62 | 421 | 583 |
| Flexural Strength × 10³ PSI | | | | |
| @ 275° F. | — | — | 22.0 | — |
| @ 400° F. | — | — | 14.6 | — |
| @ 450° F. | — | — | 0 | — |
| @ 500° F. | — | — | 0 | — |
| Thermal Aging Properties | | | | |
| Tensile Strength × 10³ PSI | | | | |
| After 500 hrs @ 500° F. | — | — | — | — |
| After 1000 hrs @ 500° F. | — | — | — | — |
| HDT, °F. | | | | |
| After 500 hrs @ 500° F. | — | — | — | — |
| After 1000 hrs @ 500° F. | — | — | — | — |
| Flexural Modulus × 10⁶ PSI | | | | |
| After 500 hrs @ 500° F. | — | — | — | — |
| After 1000 hrs @ 500° F. | — | — | — | — |
| % Polyamide-imide | | | | |
| Example I Prepared | 70 | 55 | | |
| Example II Prepared | — | — | | |
| % Polyethersulfone | | | | |
| Victrex | — | 15 | | |
| % Glass Fibers | — | — | | |
| % Graphite Fibers AS-1810 | 30 | 30 | | |
| Cavity Pressure × 10³ PSI | | | | |
| @ 18 sec | 0 | 9.3 | | |
| @ 90 sec | — | — | | |
| Total Shrinkage mils/in. (after curing @ 500° F.) | .5 | .5 | | |
| Physical Properties | | | | |
| Tensile Strength × 10³ PSI | 27.9 | 31.0 | | |
| Tensile Elongation % | 4.3 | 7.6 | | |
| Flexural Strength × 10³ PSI | 46.2 | 48.8 | | |
| Flexural Modulus × 10⁶ PSI | 2.62 | 2.50 | | |
| Izod Impact, Notched Ft-lbs/in | 0.9 | 1.4 | | |
| Thermal Properties | | | | |
| HDT, °F. | 544 | 536 | | |
| Flexural Strength × 10³ PSI | | | | |
| @ 275° F. | — | — | | |
| @ 400° F. | — | — | | |
| @ 450° F. | — | — | | |
| @ 500° F. | — | — | | |
| Thermal Aging Properties | | | | |
| Tensile Strength × 10³ PSI | | | | |
| After 500 hrs @ 500° F. | — | — | | |
| After 1000 hrs @ 500° F. | — | — | | |
| HDT, °F. | | | | |
| After 500 hrs @ 500° F. | — | — | | |
| After 1000 hrs @ 500° F. | — | — | | |
| Flexural Modulus × 10⁶ PSI | | | | |
| After 500 hrs @ 500° F. | — | — | | |
| After 1000 hrs @ 500° F. | — | — | | |

All PAI samples cured @ 500° F. Each sample also contains 1% PTFE based on total weight.
Note:
*Sample had slight distortion.
**Molded @ 670° F.
Alloys prepared with PAI as prepared in Example I were molded @ 630° F.
Alloys prepared with PAI as prepared in Example II were molded @ 650° F.

All of the materials studied were molded on the 10 oz. Stokes injection molder under Table 2 molding conditions unless specified otherwise. A 10 oz. Stokes injection molding machine is fitted with a 1:1 compression thermoset screw which can hold approximately 365 grams of the polymer (approximately 0.8 lbs). Since each test tree weighs approximately 23 grams (neat parts) only 1/16th of the complete injection stroke (shot volume) is used during the molding evaluation. Under these conditions (18 second clamp), the total time the polymer is trapped in the barrel is approximately 7.2 minutes (total cycle is 27 seconds). This does not mean that the polymer is in the melt state for the complete 7.2 minutes due to the temperature gradient (front to rear) in the barrel.

Polyamide-imide phthalamide copolymer/aromatic sulfone polymer blends flow, under molding conditions, is determined by its cavity pressure which is measured at a point farthest from the sprue. In this test, a pressure transducer is fitted behind a knockout point located behind the flex bar. The higher the cavity pressure, the better the flow thus making for easier mold filling. To determine our polyamide-imide-phthalamide copolymer aromatic sulfone polymer blends melt reactivity, a plot of cavity pressure vs. cycle time is drawn. A stable or non-reactive resin will exhibit good flow characteristics under adverse molding conditions resulting in a melt which is insensitive to a change in cycle time. A reactive polymer will be cycle time dependent in that its viscosity increases with cycle time. This is illustrated by a steep negative cavity pressure slope. Polyamide-imide-phthalamide copolymer-aromatic sulfone polymer blend samples were all dried for approximately 16 hours at 300° F. in a hot air circulating oven containing a suitable desiccant.

Polyamide-imide-phthalamide copolymer-aromatic sulfone polymer blend samples were cured in a Blue M hot air programmable oven under a 7-day cycle with 1 day each at 320° F., 400° F., 450° F., 475° F., respectively, and 3 days at 500° F. Several tensile bars were cured under a 7-day cycle with 3 days at 515° F. These parts were measured for shrinkage and were ASTM tested.

The following examples illustrate the preferred embodiment of the invention. It will be understood that the examples are for illustrative purposes only and do not purport to be wholly definitive with respect to conditions or scope of the invention.

EXAMPLE I

A 200 ml., round-bottom, 4-neck flask, equipped with a nitrogen inlet tube, stirrer, thermometer, and solids addition funnel, was charged with 99.9 parts by weight of (pbw) p,p'-oxybis(aniline) (OBA), 23.1 pbw metaphenylenediamine (MPDA) and 604 pbw N-methylpyrrolidone (NMP). When solution at room temperature (72° F.) was complete, 142.5 pbw 4-trimellitoyl anhydride chloride (4-TMAC), having a percent purity of 99.5 percent±0.5 percent as determined from chloride content and 6.8 pbw of trimellitic acid anhydride (TMA) was added over 2.5 hours while maintaining a solution temperature of between about 77°–95° F. When addition was complete, the solution was stirred for 3 hours during which time the solution viscosity increased to a Gardner-Holdt value of Z5, or about 110 poises.

Solid polymer was obtained by first pouring the viscous solution into twice its volume of distilled water in a Waring blender and then filtering. The filtrate was washed with 5 increments of 3000 pbw each of distilled water to remove hydrogen chloride that had been generated during reaction.

The solid was dried under a vacuum of 20 inches of mercury for 24 hours at 122° F. The above material was heated for 2 hours in an oven set at 450° F. to give the final product.

EXAMPLE II

A 10 gal., glass-lined Pfaudler kettle equipped with a water-cooled jacket and nitrogen inlet was charged with 9.87 lbs of m-phenylenediamine, 0.35 lbs of trimellitic anhydride and 59.2 lbs of N-methylpyrrolidone. After solution had occurred under a nitrogen purge, an intimate blend of 9.52 lbs of 4-trimellitoyl anhydride chloride and 9.17 lbs of isophthaloyl dichloride was added over 2.5 hrs keeping the temperature below 35° C. The resulting viscous solution was brought to 50° C. When the Gardner viscosity had reached a Z3 viscosity, the solution was precipitated by passage trough a Fitzpatrick comminuting mill. The polymer product was washed five times with deionized water followed by air-drying on a filter for 3 days. The product was then brought to a solids content of 98.3 percent by heating in a forced air oven for 2 hrs at 470° F.

EXAMPLE III

Metaphenylenediamine (540 g) and acetic acid (900 ml) were placed in a five-liter, three-necked, round-bottom flask, equipped with mechanical stirrer, pressure equalizing addition funnel and nitrogen sparge tube, and distillation head and condenser. The nitrogen sparge was set at 300 cc/min and 765 g of acetic anhydride were added over 5 min. This was followed by the addition of 415 g of isophthalic acid and 480 g of trimellitic anhydride. The temperature of the bottom half of the spherical heating mantle surrounding the flask was set at 700° F. and the top half of the mantle was heated with a Variac set at 50. After 105 min, 1730 ml of distillate was collected and the polymer had become very viscous. The heat was turned off and the polymer was cooled under nitrogen.

EXAMPLE IV

A 690 gram portion of dimethylacetamide was stirred and cooled to 5° C. with dry nitrogen purging to keep the system dry. An intimate mixture composed of 252.2 grams of 4-TMAC, 119.0 grams of p',p-methylene-bis-(aniline), and 120.0 grams of p,p'-oxybis(aniline) was then added to the solvent over a period of 30 minutes. The temperature of the reaction was allowed to rise to 50° C. At that temperature it was controlled by means of an ice bath. An additional 100 grams of DMAC were then added to wash in all solids, and the reaction continued for another 3½ hours at 50° C. The reaction solution was then poured into a large excess of rapidly-agitated water, whereupon precipitation of the copolymer took place. The solids were then washed several times with distilled water and soaked overnight. Finally, the solids were dried at 120° F. A 443 gram yield of the copolymer was obtained.

EXAMPLE V

A solution consisting of 533.3 grams of NMP, 300 grams of DMAC, and 58.0 grams of propylene oxide was stirred and cooled to 8° C. A mixture of 168.5 grams of 4-TMAC, 80.1 grams of OBA, and 79.3 grams of MBA was then added to the solvent over a period of 50 minutes. During this time the reaction was allowed to warm to 36° C. An additional 66.7 grams of NMP were added to wash in all solids, then the reaction mixture was heated to 50° C. and held at that temperature for 3½ hours. The solution was then filtered.

EXAMPLE VI

The general procedure for preparing a copolymer containing three diamines is illustrated by the reaction of OBA, MPDA and MBA and 4-TMAC in DMAC. Thus, a 242.0 gram portion of OBA (1.21 moles), a 130.7 gram portion of MPDA (1.21 moles) and a 239.6 gram portion of MBA (1.21 moles) were dissolved in 3,900 grams DMAC contained in a 6-liter flask, equipped with a nitrogen purge, stirrer, addition funnel and thermometer. A 765 gram portion of 4-TMAC (3.63 moles) in flake or lump form was then added to the solution in portions, over a period of 90 minutes. The reaction exotherm was allowed to raise the temperature to about 35° C. The reaction temperature was maintained at 33°–38° C. for the remainder of the 4-TMAC addition using cooling water when necessary. After the TMAC addition was completed, any residual TMAC clinging to the addition funnel was completely washed into the reaction solution with 70 grams DMAC. A heating mantle was applied to the reaction flask and the temperature quickly raised (about 20 min.) to 50° C. The reaction solution was stirred at 50° C. for 90 minutes and then the solution precipitated by admixing with water. Prior to precipitation the solution viscosity was about 7.5 stokes (25° C., 20 percent solids). The polymer was precipitated in distilled water in a model D, W. J. Fitzpatrick Company, comminuting machine (Fitz mill). After precipitation, the polymer was washed with distilled water to aqueous pH 4 to 5 (3 to 4 hours washing time), then filtered onto large Buchner funnels. The polymer was dried overnight by drawing air through the funnels, then finally dired in an aeromat drier at 30°–35° C. for 12–15 hours.

EXAMPLE VII

A 78 gram amount of the copolymer in powdered form, made according to the procedure set forth in Example I, was heated at 550° F. for about 1 hour. It was then cooled and charged cold into a mold preheated in the press to about 600° F. to about 650° F. A maximum pressure of 4,200 psi was applied over a 25 minute period and thereafter the mold and contents cooled to 500° F. under a pressure of 2,100 psi and the molded item immediately ejected. A disk measuring 5½ inches in diameter and ⅛ inch thick had been formed.

EXAMPLE VIII

A 10 gal., glass-lined Pfaudler kettle equipped with a water-cooled jacket and nitrogen inlet was charged with 9.87 lbs of m-phenylenediamine, 0.35 lbs of trimellitic anhydride and 59.2 lbs of N-methylpyrrolidone. After solution had occurred under a nitrogen purge, an intimate blend of 9.52 lbs of 4-trimellitoyl anhydride chloride and 9.17 lbs of isophthaloyl dichloride was added over 2.5 hrs while keeping the temperature below 35° C. The resulting viscous solution was brought to 50° C. When the Gardner viscosity had reached a Z1 viscosity the solution was precipitated by passage through a Fitzpatrick comminuting mill. The polymer product was washed five times with deionized water followed by air-drying on a filter for 3 days. The product was then brought to a solids content of >98% by heating in a forced air oven for 2 hrs at 470° F.

EXAMPLE IX

A round-bottom, 2000-ml, 4-necked flask was charged with 1045 g dry N-methylpyrrolidone (NMP), 16.2 g (1.5 mol) m-phenylenediamine (MPDA), and 4.3 g trimellitic anhydride (TMA) (0.0225 mol). The flask was equipped with a mechanical stirrer, nitrogen inlet tube, thermometer, and a liquid addition funnel. During solution of the diamine and TMA, the addition funnel was charged with 248.0 g (1.178 mol) 4-trimellitoyl anhydride chloride (4-TMAC) and 60.9 g (0.30 mol) isophthaloyl dichloride (IPCl$_2$) and melted at 80° C. When melting was complete, the solution of acid chlorides was added to the diamine/TMA solution over a 2-hour period at 25°-35° C. After addition was complete, the viscous solution was heated to 50° C. and held for 1 hour.

EXAMPLE X

Polyamide-imide/aromatic sulfone polymer blends can be prepared by physically blending the constituents together, either pellet to pellet, powder to powder, powder to pellet, or pellet to powder, with or without a compounding step prior to injection molding. It is preferred that the constituents are melt compounded, especially on a twin-screw extruder.

The alloys have been melt compounded on a Werner & Pfleiderer twin-screw extruder (ZSK-30) prior to molding unless specified otherwise. All samples have had at least 0.5 percent PTFE added at a fabrication aid.

EXAMPLE XI

When the prepared polyamide-imide of example I is alloyed with 10%, 20%, or 30% by polymer weight of polyethersulfone (Victrex 600P), significant improvements in Dart impact resistance of the unfilled polyamide-imide are seen. Each alloy was injection molded into 60 mil plaques and then cured on a standard 7-day cycle with 3 days at 505° F. The impact results of the as-molded and cured PAI alloys are reported below. Notice the significant improvement in Dart impact after the PAI and its alloys are cured. The PES does not restrict the excellent curing characteristics of the amide-imide allowing the alloys to build properties during cure. The data below illustrate the importance of curing and suggest that the as-molded alloy has little, if any, commercial use due to its poor mechanical properties.

|  | Dart Impact, In-Lbs | |
|---|---|---|
| % Polyethersulfone | As-Molded | Cured @ 505° F. |
| 0 | 0.83 | 20.3 |
| 10 | 0.8 | 33.2 |
| 20 | 1.90 | 126.7 |
| 30 | 1.60 | 101.8 |

EXAMPLE XII

When the prepared polyamide-imide of example II is alloyed with 20% by polymer weight of polyethersulfone, significant improvement in the impact strength of the unfilled polyamide-imide is seen. The neat polyamide-imide as prepared in Example II was so weak and brittle that during molding the test specimen shattered upon ejection. The example II prepared PAI when blended with PES according to the process of Example X molded well with no sign of part cracking. Below are typical impact values of the cured alloy.

|  | Impact Properties | |
|---|---|---|
| % Polyethersulfone | Notched Izod ft-lbs/in | Dart Impact in-lbs |
| 0 | 0.3 | <2.0 |
| 20 | 1.20 | 21.4 |
| 30 | 1.00 | — |

EXAMPLE XIII

Fiber filled polyamide-imide-phthalamide copolymers cannot be economically molded into crack-free thick wall parts which have cross-sections greater than 250 mils. It is believed that the as-molded strength and toughness properties of these polyamide-imides cannot withstand the molding cooldown stresses resulting in parts with internal cracks which are not commercially acceptable. We have found that when polyethersulfone is alloyed with a fiber filled polyamide-imide-phthalamide copolymer, the as-molded strength and toughness properties are drastically improved and that as a result thicker wall parts can be molded crack-free.

| 40% Glass Fiber Filled Polyamide-imide with % Polyethersulfone | | | |
|---|---|---|---|
|  | 0 | 10 | 20 |
| As Molded Properties |  |  |  |
| Tensile Strength PSI | 10,800 | 20,000 | 18,900 |
| Tensile Elongation % | 2.0 | 3.1 | 3.0 |
| Izod Impact, Notched Ft-lbs/in | 1.0 | 1.62 | 1.42 |
| Flexural Modulus PSI | 2,080,000 | 2,000,000 | 1,950,000 |
| HDT, °F. | 500 | 511 | 504 |
| Thick wall molding (% Crack-free parts)* 4" × 0.5" Thick Disc | 0 | 10 | 50 |

| 40% Glass Fiber Filled Polyamide-imide with % Polyethersulfone | | | |
|---|---|---|---|
| | 0 | 10 | 20 |
| 5.5″ × 0.43″ Thick Disc | 5 | — | 86 |

*Parts were X-rayed with a Hewlett-Packard 4380500 X-ray System.

I claim:

1. A composition comprising (a) about 90 to about 70 parts by weight of an amide-imide phthalamide copolymer which comprises recurring polyamide A units of:

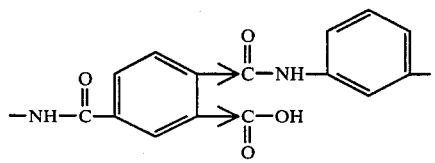

which are capable of undergoing imidization, and polyamide B units of:

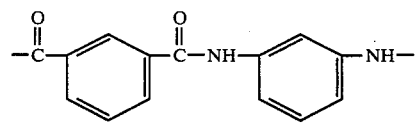

wherein the molar ratio of A units to B units is about one to one, → denotes isomerization and (b) about 10 to about 30 parts by weight of a polyethersulfone which comprises recurring units of:

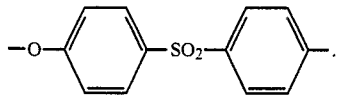

2. A composition comprising (a) about 90 to about 70 parts by weight of an amide-imide phthalamide copolymer which comprises recurring polyamide-imide A′ units of:

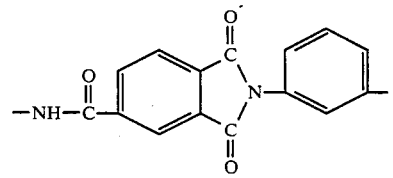

and polyamide B units of:

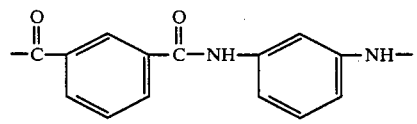

wherein the molar ratio of A′ to B units is about one to one and (b) about 10 to about 30 parts by weight of a polyethersulfone which comprises recurring units of:

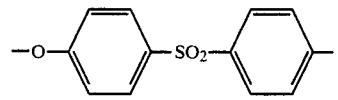

3. The composition of claim 2 in the form of a molded object.

4. The molded object of claim 3 wherein the molded object comprises about 10 to about 80 weight percent of glass fiber, glass beads or graphite coated with an aromatic sulfone polymer.

5. The molded object of claim 3 wherein the molded object comprises about 10 to about 80 percent by weight of glass fiber, glass beads, graphite fiber, or graphite powder.

6. The molded object of claim 4 wherein said aromatic sulfone polymer is a polyethersulfone polymer having recurring units of:

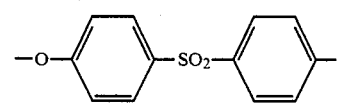

7. A filled composition comprising (1) about 20 to about 90 weight percent of a polymer blend said blend comprising (a) about 90 to about 70 percent by weight of an amide-imide phthalamide copolymer which comprises recurring polyamide-imide A′ units of:

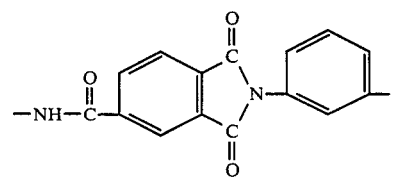

and polyamide B units of:

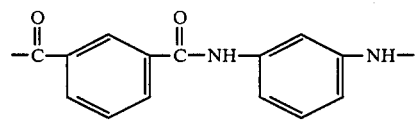

wherein the molar ratio of A′ to B units is about one to one, and (b) about 10 to about 30 weight percent of a polyethersulfone which comprises recurring units of:

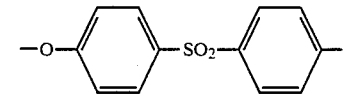

and (2) about 80 to about 10 weight percent of a filler selected from the group consisting of glass fiber, glass beads, mineral fillers, graphite fiber and graphite powder.

8. A process for improving the impact resistance of an amide-imide phthalamide copolymer said copolymer comprising recurring polyamide-imide A′ units of:

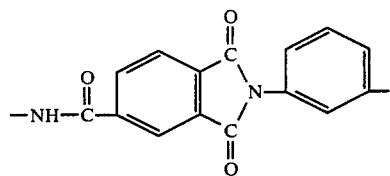
and polyamide B units of:
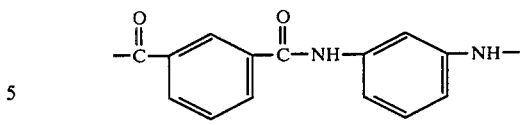
wherein the molar ratio of A' to B units is about one to one, said process comprising adding a polyethersulfone which comprises recurring units of:
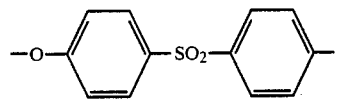
in an amount such that said polyethersulfone comprises about 10 to about 30 percent by weight of the final composition.
* * * * *

UNITED STATES PATENT OFFICE
CERTIFICATE OF CORRECTION

Patent No. 4,684,674　　　　　　　　　　Dated　August 4, 1987

Inventor(s) Gary T. Brooks

It is certified that error appears in the above-identified patent and that said Letters Patent are hereby corrected as shown below:

| Patent Column | Line | |
|---|---|---|
| 1 | 55 | reads "0.01" and should read --.1-- |
| 3 | 25 | reads "$\Sigma$" and should read "$\rightarrow$" |
| 9 | 58 | reads "begun our work" and should read --began our work-- |
| 19 | 60 | reads "at a fabrication" and should read --as a fabrication-- |
| 2 | 52 | reads "[chemical structure]" and should read --[chemical structure]-- |

Signed and Sealed this

First Day of March, 1988

Attest:

DONALD J. QUIGG

Attesting Officer　　　Commissioner of Patents and Trademarks